United States Patent [19]

Narusawa

[11] Patent Number: 5,031,052
[45] Date of Patent: Jul. 9, 1991

[54] COLOR PHASE CORRECTION CIRCUIT

[75] Inventor: Sadayuki Narusawa, Hamamatsu, Japan

[73] Assignee: Yamaha Corporation, Hamamatsu, Japan

[21] Appl. No.: 258,015

[22] Filed: Oct. 14, 1988

[30] Foreign Application Priority Data

Oct. 16, 1987 [JP] Japan .............................. 62-261346

[51] Int. Cl.$^5$ .............................. H04N 9/89
[52] U.S. Cl. ........................ 358/312; 358/326
[58] Field of Search ............ 358/310, 320, 322, 323, 358/324, 325, 326, 342, 337, 339

[56] References Cited

U.S. PATENT DOCUMENTS

| 4,090,215 | 5/1978 | Buchan et al. | 358/325 |
| 4,287,529 | 9/1981 | Tatami et al. | 358/320 |
| 4,555,734 | 11/1985 | Fukui | 358/337 |

Primary Examiner—Donald McElheny, Jr.
Attorney, Agent or Firm—Spensley, Horn, Jubas & Lubitz

[57] ABSTRACT

A color phase correction circuit for a video disc playback device comprises a circuit for generating a saw-tooth wave at a timing of a reference signal, a sample-hold circuit for sample-holding the saw-tooth wave at a timing of a synchronizing signal in a reproduced video signal, a circuit for controlling delay time of the reproduced video signal by the sample-hold output and a timing changing circuit for shifting the phase of the saw-tooth wave forward or backward alternately by time length sustantially corresponding to 180 degree phase of color burst at each track-kick. By correcting time base of the reproduced video signal by shifting the phase of the saw-tooth wave at each track-kick, color inversion and color irregularlity occurring in a reproduced picture in a still-picture mode or a trick-play mode can be effectively prevented.

2 Claims, 4 Drawing Sheets

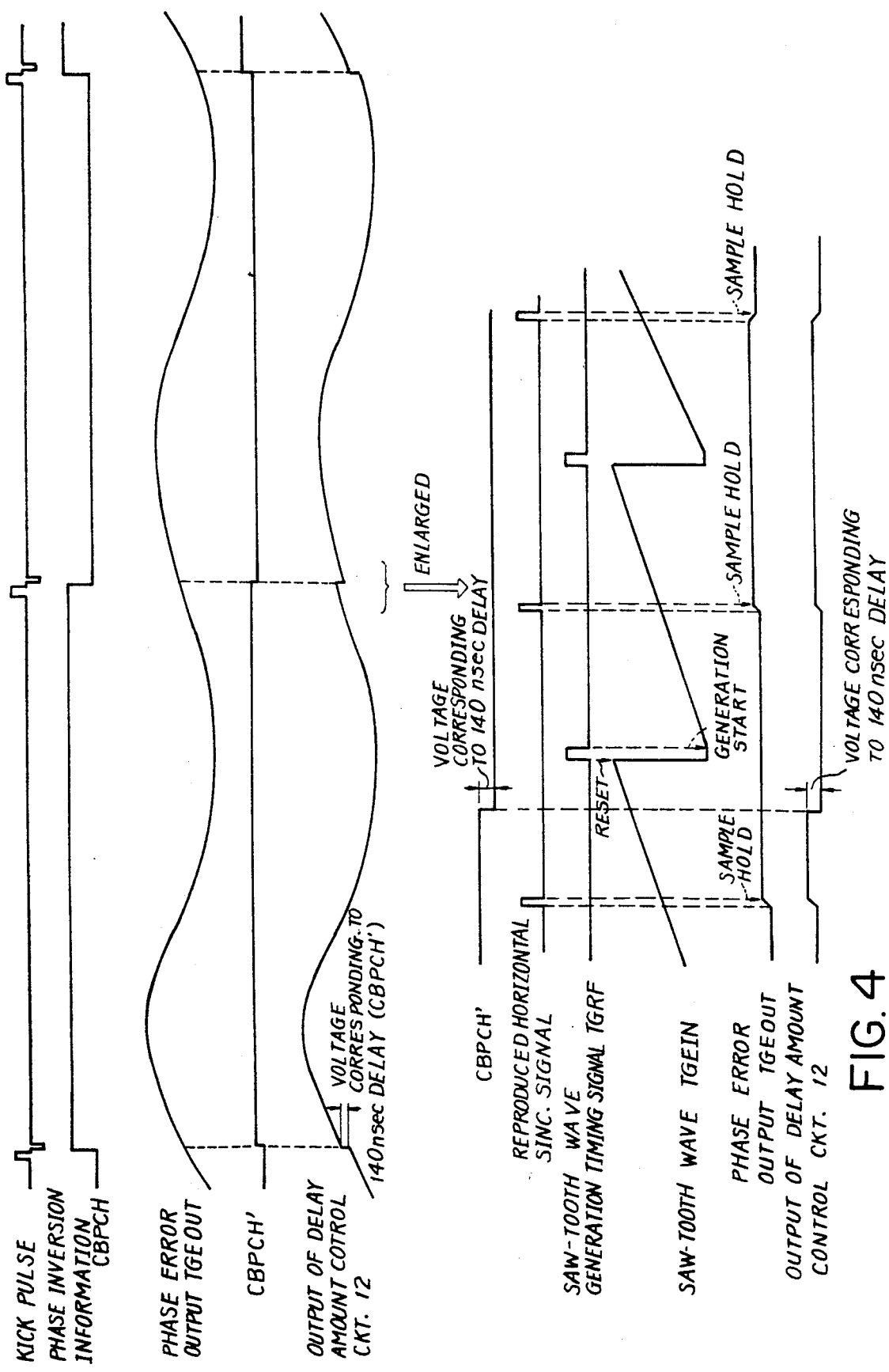

COLOR PHASE CORRECTION CIRCUIT

BACKGROUND OF THE INVENTION

This invention relates to a color phase correction circuit for a video disc playback device capable of preventing color irregularity in a picture caused by track-kicking in reproducing a picture in a still-picture mode or a trick-play mode.

Functions of a video playback device include still-picture and trick-play functions. A still-picture is produced by repeated reproduction of a picture from the same track. The trick-play function includes a frame skip function. These functions are obtained by track-kicking or track-jumping a laser beam of an optical pickup to next track. In the prior art video disc playback device, however, if a track-kick is executed, it will cause a color inversion or color irregularity in a scanning line, bordering where the track-kick is executed. This is because, in a CAV disc of NTSC system whose revolution speed is constant, there is 180 degree difference in color burst between adjacent tracks.

For example, as shown in FIG. 2, in a case where a track-kick is executed during a horizontal scanning period, the color of a picture during the period ① after the track-kick is inverted by the track-kick, because the color of the picture on the side of a TV receiver is determined by the color burst A of the preceding track. At the next scanning line, a reference sub-carrier wave on the side of the TV receiver is re-established by the color burst B so that this color inversion is cancelled during the period ②. However, it takes relatively long time for this re-establishment due to the change of large magnitude, i.e., 180 degrees, of the color burst, so that irregularity of the reference sub-carrier tends to occur during the re-establishment thereby causing disturbance in the color of the picture.

In the foregoing manner, if a track-kick was executed in the prior art video disc playback device, it always caused a color inversion in one of the scanning lines, which was conspicuous in the picture, or produced a color irregularity in the picture for a while after the track-kick.

To cope with this problem, it has been practiced to prevent the color inversion by utilizing the time base control of a video signal by TBC (Time Base Corrector), i.e., by forcibly varying, in track-kicking, the time base of a video signal forward or backward by a time length which corresponds to 180 degree phase of a color burst.

FIG. 3 shows a prior art circuit to realize the above described method. A signal reproduced from a disc is applied to a main TBC 10. The main TBC 10 removes jitter (time base variation) in a video reproduced signal, and is constructed, for example, of a continuously variable delay circuit of binaly signal. For such continuously variable delay circuit, a CMOS gate circuit as disclosed in Japanese Preliminary Patent Publication No. 61-39721, for example, may be employed. The CMOS gate circuit is constructed of a P-channel MOS-FET and an N-channel MOS-FET. In this circuit, charging and discharging currents flow in accordance with load capacity formed on the output side to provide a delay characteristic. The delay time of this circuit changes in accordance with the power voltage, because conductance of the elements changes in accordance with the power voltage. That is, the high the power voltage, the shorter is the delay time, and the lower the power voltage, the longer the delay time. The continuously variable delay circuit consisting of the CMOS gate circuit delays the binaly signals by utilizing this delay characteristic.

The main TBC 10, being controlled in its delay time by a delay amount control circuit 12 as will be described later, absorbs jitter in the reproduced signal from the disc.

The reproduced signal delivered out of the main TBC 10 is applied to a BPF (band-pass filter) 14, in which a video signal component is separated, and a horizontal synchronizing signal is detected through an FM detection circuit 16 and a horizontal synchronizing signal separation circuit 18. From a reference counter 20, a saw-tooth wave generation timing signal TGRF is produced at a timing which synchronizes with a reference horizontal synchronizing signal. This signal TGRF is received by a saw-tooth wave generation circuit 22 which thereupon generates a saw-tooth wave TGEIN of a predetermined gradient to detect a phase error.

A sample-hold circuit 24 holds TGEOUT which is a level corresponding to the phase error between the reproduced horizontal synchronizing signal and the reference horizontal synchronizing signal, by sample-holding, with the detected horizontal synchronizing signal, the level of the saw-tooth wave TGEIN produced by the saw-tooth wave generation circuit 22 in synchronization with the reference horizontal syncronizing signal. The delay amount control circuit 12 controls the time base of the disc reproduced signal, by controlling the delay time of the main TBC so as to reduce this phase error to zero.

The video signal component separated in the BPF 14 is applied to a color TBC 26. The color TBC 26, which removes jitters which can not be removed in the main TBC 10, may be constructed, for example, of a continuously variable delay circuit of binary signal employing a CMOS gate circuit as in the main TBC 10. A delay amount control circuit 28 compares in phase a color burst in a video signal separate through an FM detection circuit 30 and a color subcarrier BPF 32 located on the output side of the color TBC 26, with a reference clock of 3.58 MHz, which corresponds to a regular subcarrier produced by the reference counter 20, and controls, in case it is constructed of a CMOS gate circuit, the power voltage of the color TBC 26 in accordance with this phase error to control the delay time and absorb a fine jitter in the video signal. In this manner, a video signal in which jitter has been removed is provided from the color TBC 26.

A system control 34 produces various commands. When a track-kick command for one track is produced in accordance with a still-picture command or a trick play command, a phase inversion information signal CBPCH is provided by a phase inversion information output circuit 36. This signal CBPCH is a signal which changes alternately to "1" and "0" each time a track-kick command is provided.

The signal CBPCH is reduced in its voltage level by an attenuator 38, to a level whose level "1" changes the delay time of the main TBC 10 by time length (140 nsec) which, correspondes to the 180 degree phase of the color burst, and becomes a signal CBPCH'. When the signal CBPCH' is delivered out, the delay amount control circuit 12 controls the delay time of the main TBC by adding this signal CBPCH' to the phase error output TGEOUT provided from the sample-hold circuit 24.

The main TBC 10 is thereby controlled in delay time by time length corresponding to the 180 degree phase forward or backward at each track-kick. As a result, the color inversion caused by a track-kick is prevented.

FIG. 4 shows an operation of the circuit of FIG. 3 in track-kicking. The saw-tooth wave TGEIN is generated in a predetermined gradient with its timing of generation (charging) and reset (discharging) being determined by the saw-tooth wave generation timing signal TGRF which is synchronized with the reference horizontal synchronizing signal. This saw-tooth wave TGEIN is sample-held by the sample-hold circuit 24 at the timing of the reproduced horizontal synchronizing signal, and this sample-hold value becomes the phase error output TGEOUT.

The phase inversion information CBPCH repeats "1" and "0" each time a kick pulse is applied, and voltage of this "1" level is reduced by the attenuator 38 to the level which corresponds to the delay time of 140 nsec to become the signal CBPCH', which is added to the sample-hold output. The sum signal becomes the output of the delay amount control circuit 12. In this way, the color inversion of a picture is prevented by shifting the time base of the reproduced signal from the disc forward or backward by time length corresponding to the 180 degree phase of the color burst.

In this prior art circuit, the voltage CBPCH' corrected by a track-kick was added in an analog manner to the phase error voltage TGEOUT obtained by sample-holding the saw-tooth wave TGEIN with the reproduced horizontal synchronizing signal. In this circuit however, it was difficult to set the constant of the attenuator 38 to generate the voltage CBPCH' which is voltage corresponding to the delay time corresponding to the 180 degree phase of color burst. Therefore it was difficult to deliver out an accurate voltage and thereby prevent the color irregularity accurately.

It is, therefore, an object of the invention to provide a color phase correction circuit, capable of preventing a color inversion caused by a track-kick by detecting an accurate delay amount which corresponds to the 180 degree phase of the color burst.

SUMMARY OF THE INVENTION

A color phase correction circuit achieving the above object of the invention is characterized in that it comprises means for generating a saw-tooth wave in a predetermined gradient at a timing of a reference signal, means for sample-holding the saw-tooth wave at a timing of a synchronizing signal in a reproduced video signal, means for controlling delay time of the reproduced video signal by this sample-hold output, and timing changing means for shifting the phase of the saw-tooth wave forward or backward alternately at each track-kick to an adjacent track by time length substantially corresponding to 180 degree phase of the color burst.

According to this invention, by shifting the phase of the saw-tooth wave forward or backward by the time length substantially corresponding to the 180 degree phase of the color burst at each track-kick, the sample-hold level is corrected by the time length shift corresponding substantially to the 180 degree phase of the color burst.

By this arrangement, the phase of the saw-tooth wave can be readily and precisely controlled by controlling the timing of the starting generation of the saw-tooth wave and, accordingly, color inversion as well as color irregularity can be prevented.

A preferred embodiment of the invention will now be described with reference to the accompanying drawings.

BRIEF DESCRIPTION OF THE DRAWINGS

In the accompanying drawings,

FIG. 4 is a waveform diagram showing an operation of the circuit of FIG. 3;

DESCRIPTION OF A PREFERED EMBODIMENT

Figures 1, 5:
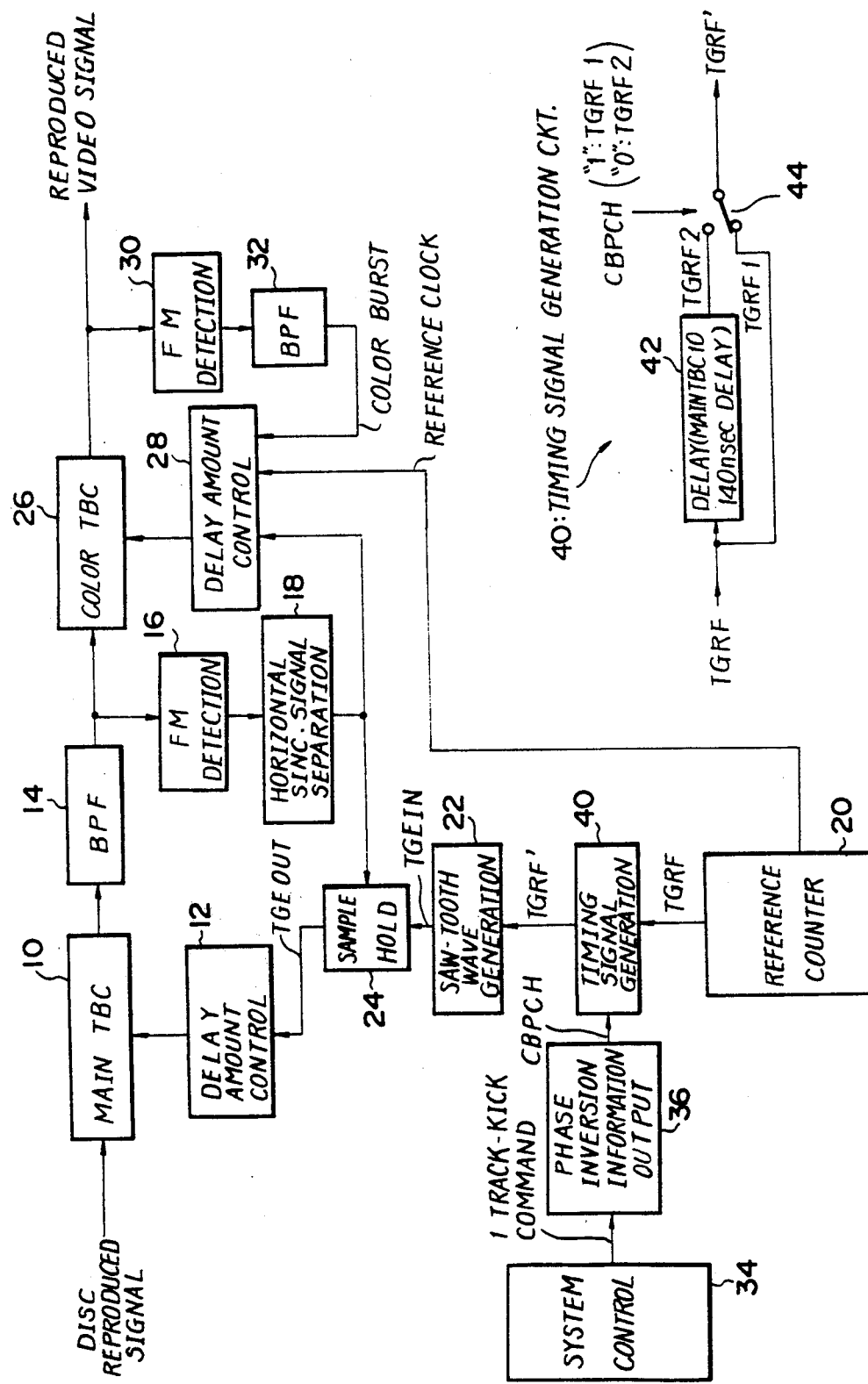
FIG. 1 is a block diagram showing an embodiment of the color phase correcting circuit according to this invention in which components common to those of the prior art circuit of FIG. 3 are designated by the same reference characters.
FIG. 5 is a circuit diagram showing a specific example of a timing signal generation circuit 40 in FIG. 1.
Figure 2:
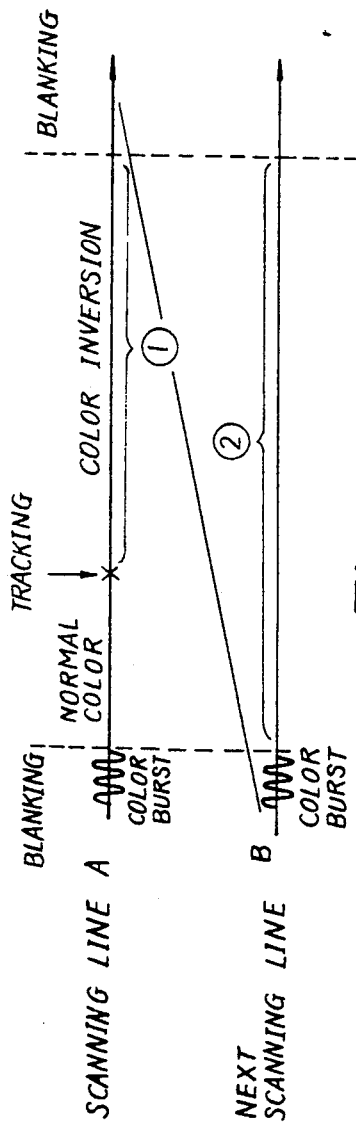
FIG. 2 is a graph showing a color inversion of a disc reproduced video picture caused by a track-kick.

Referring first to FIG. 1, a signal reproduced from a disc is applied to main TBC 10. Description will be made about this main TBC 10, in which jitter in the disc reproduced signal is removed, on the assumption that it is constructed of a continuously variable delay circuit of binary signal, employing a CMOS gate circuit as disclosed in the Japanese Preliminary Patent Publication No. 61-39721.

The main TBC 10, whose delay time is controlled by a delay amount control circuit 12 as described later, absorbs jitter in a reproduced signal from a disc.

The reproduced signal provided from the main TBC 10 is applied to a BPF (band-pass filter) 14, in which a video signal element is separated, and a horizontal synchronizing signal is detected through an FM detection circuit 16 and a horizontal synchronizing signal separation circuit 18. From a reference counter 20, a saw-tooth wave generation timing signal TGRF is delivered out at a timing which is synchronized with a reference horizontal synchronizing signal. This signal TGRF becomes a signal TGRF' through a timing signal generation circuit 40. This signal TGRF' is received by a saw-tooth wave generation circuit 22, in which a saw-tooth wave TGEIN in predetermined gradient used for detecting a phase error, is generated.

A sample-hold circuit 24 holds TGEOUT, a level which corresponds to the phase error between the reproduced horizontal synchronizing signal and the reference horizontal synchronizing signal, by sample-holding, with the detected horizontal synchronizing signal, the level of the saw-tooth wave TGEIN generated from the saw-tooth generation circuit 22 in synchronization with the reference horizontal synchronizing signal. The delay amount control circuit 12 controls time base of the disc reproduced signal by controlling the delay time of the main TBC 10 so as to reduce this phase error to zero.

The video signal component separated in the BPF 14 is applied to a color TBC 26. This color TBC 26, which is a circuit used for absorbing fine jitters which can not be removed in the main TBC 10, is constructed, for example, of a continuously variable delay circuit of binary signal using a circuit such as a CMOS gate circuit as in the main TBC 10. A delay amount control circuit 28 controls the delay time of the color TBC 26 by comparing in phase a color burst in a video signal detected through an FM detection circuit 30 and a color subcarrier BPF 32 provided on the output side of the color TBC 26 with a reference clock of 3.58 MHz corresponding to a regular color subcarrier provided by the reference counter 20, and controlling a power voltage of the color TBC 26, in case the color TBC 26 is constructed of a CMOS gate circuit, in accordance with phase error between the color burst and the reference clock to absorb fine jitters in the video signal. The timing for comparing the color burst with the reference clock in phase should be taken during the period of the color burst, and, for this reason, horizontal synchronizing signal information is provided by the horizontal synchronizing signal separation circuit 18 and applied to this circuit to perform control so that comparison is made at a timing delayed from this horizontal synchronizing signal timing by a predetermined time length. In this manner, a video signal in which jitter has been removed is provided from the color TBC 26.

From a system control 34 are produced various commands. When a track-kick command for one track is delivered out based on such commands as a still picture command or a trick-play command, a phase inversion information signal CBCH is provided by a phase inversion information output circuit 36. This signal CBPCH is a signal which changes to "1" and "0" alternately each time one track-kick command is produced.

A timing signal generation circuit 40 constitutes timing changing means for shifting the phase of a saw-tooth wave forward or backward alternately at each track-kick to an adjacent track by time length corresponding to 180 degrees of the color burst. This timing signal generation circuit 40, as shown in FIG. 5 for example, may be constructed of a transmission channel TGRF1 to transmit the saw-tooth wave generation timing signal TGRF as it is, a transmission channel TGRF2 to deliver out the signal TGRF through a delay circuit 42, and a switch 44 to switch the transmission channel between TGRF1 and TGRF2 in response to a phase inversion information signal CBPCH. Delay time of the delay circuit 42 corresponds to the phase change amount of the saw-tooth wave, which corresponds to the voltage change of the sample-hold output TGEOUT by the amount which changes the delay time of the main TBC 10 by the time length corresponding to the 180 degree phase (140 nsec) of the color burst. In changing of the signal CBPCH to "1" or "0" at each track-kick, if the signal CBPCH is "1", the switch 44 is connected to the transmission channel TGRF1, and the saw-tooth wave generation timing signal TGRF is delivered out as it is. When the signal CBPCH is turned to "0", the switch 44 is connected to the transmission channel TGRF2, the signal TGRF is delivered out after being delayed by a predetermined period, and the saw-tooth wave generation timing is delayed in accordance with it. Therefore, as the timing to sample-hold the saw-tooth wave TGEIN is shifted in comparison with respect to the reproduced horizontal synchronizing signal, the sample-hold output TGEOUT is changed. By this change of the sample-hold output TGEOUT, the delay time of the main TBC 10 is forcibly varied by the time length corresponding to the 180 degree phase of the color burst, whereby color inversion caused by a track-kick is prevented.

Figure 6:
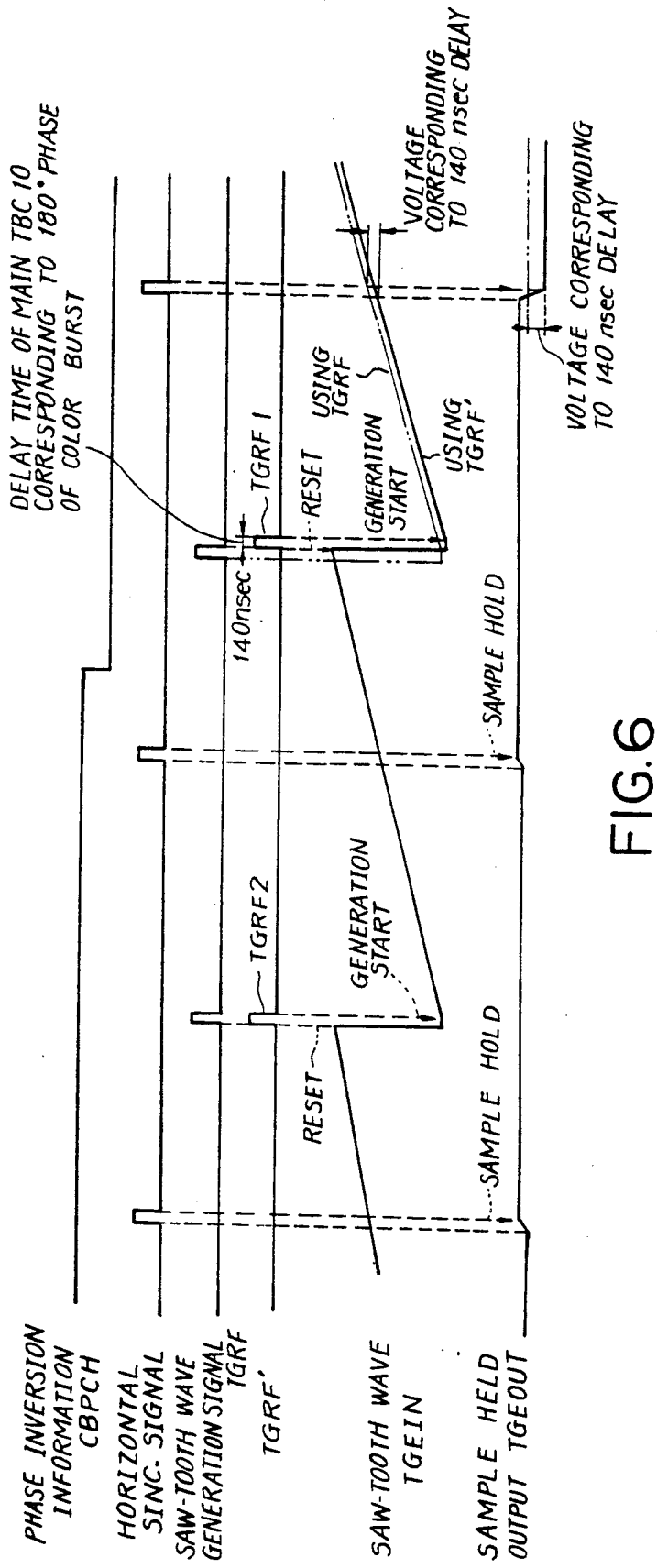
FIG. 6 is a waveform diagram showing an operation of the circuit of FIG. 1.
Figure 3:
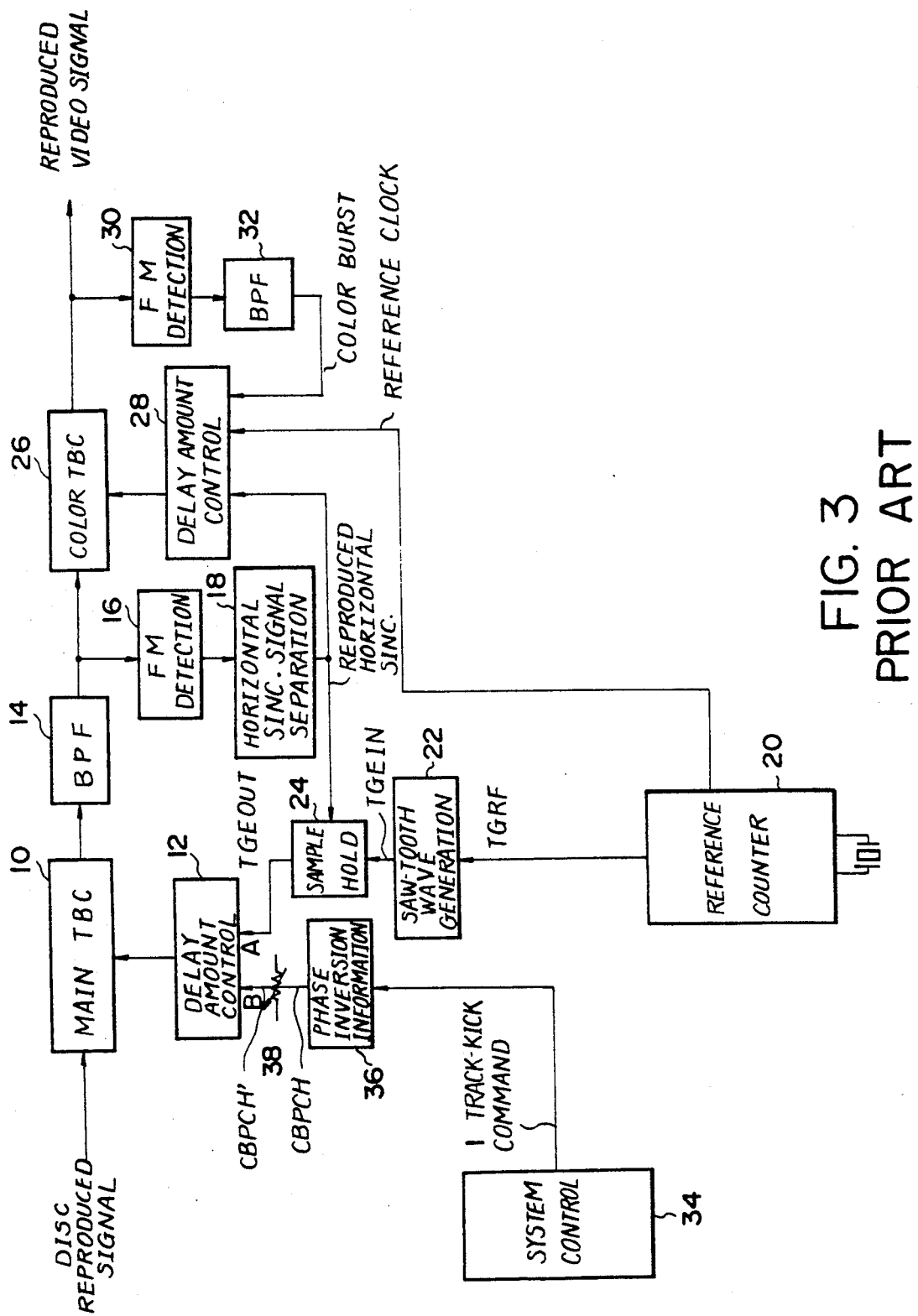
FIG. 3 is a block diagram showing the prior art color phase correction circuit.

FIG. 6 shows an operation of the circuit of FIG. 1. The saw-tooth wave generation timing signal TGRF is produced in synchronization with the reference horizontal synchronizing signal so that the saw-tooth wave TGEIN is sample-held at its center by the reproduced horizontal synchronizing signal when the phase error is zero. The saw-tooth wave TGEIN is reset at rising of the signal TGRF' and starts to be generated at the falling edge thereof. If the phase inversion information CBPCH is "1", the signal TGRF becomes a signal TGRF' without being delayed and controls the generation of the saw-tooth wave TGEIN, whereas if the phase inversion information CBPCH becomes "0" in accordance with a track-kick command, the signal TGRF delayed in the delay circuit 42 controls the generation of the saw-tooth wave TGEIN to delay the generation of the saw-tooth wave TGEIN. Accordingly, the level of the sample-hold output is reduced, the delay time of the main TBC is forcibly varied by the time length corresponding to the 180 degree phase of the color burst to prevent the color inversion and the color irregularity caused by the track-kick.

In the next track-kick, the phase inversion information CBPCH is turned to "1", the saw-tooth wave generation timing signal TGRF is delivered out as the signal TGRF' without delay, and controls the generation timing of the saw-tooth wave TGEIN so that the saw-tooth wave TGEIN is generated at an earlier timing. The level of the sample-hold output TGEOUT accordingly becomes high and the delay time of the main TBC 10 is forcibly varied by the time length corresponding to the 180 degree phase of the color burst to prevent the color inversion and the color irregularity.

In the above described embodiment, the delay control of the reproduced video signal is achieved by the CMOS gate circuit. However, other variable delay means such as a CCD (Charge Coupled Device) and a variable delay line may be employed.

According to this invention, as explained above, by correcting the time base of the reproduced video signal by shifting the phase of the saw-tooth wave forward or backward by time length corresponding to the 180 degree phase of the color burst at each track-kick, the color inversion and the color irregularity caused by the track-kick can be prevented. Further, the phase of the saw-tooth wave can be controlled readily and precisely by controlling its generation starting timing (it becomes more accurate if it is controlled digitally, as shown in the embodiment), so that the color inversion and the color irregularity caused by the track-kick can be prevented.

What is claimed is:
1. A color phase correction circuit for a video disk playback device capable of preventing color irregularity in a reproduced video signal due to a track-kicking operation, said correction circuit comprising:
reference signal generating means for generating a reference signal having a predetermined period;
saw-tooth wave generating means for generating a saw-tooth wave with a predetermined gradient in response to the reference signal;
sample-hold means for sample holding the saw-tooth wave in synchronization with a synchronizing signal contained in the reproduced video signal;
delay means for imparting a delay to the reproduced video signal corresponding to the sample-hold out- put in order to control the phase relationship between the reference signal and the synchronizing signal contained in the reproduced video signal; and time changing means for shifting the phase of the reference signal forward or backward alternately by a time length corresponding substantially to 180° phase of the color burst at each track-kick operation thereby to alter the timing of generation of the saw-tooth wave and thus the amount of delay imparted by the delay means.

2. A color phase correction circuit as defined in claim 1, wherein said time changing means comprises:
- a first and second signal path for transmitting the reference signal from the reference signal generating means to the saw-tooth wave generating means, the second signal path including means for delaying the reference signal an amount corresponding to a 180° phase delay of a color burst; and
- switching means for switching transmission of the reference synchronizing signal between the first and the second paths in response to a track-kick command.

* * * * *